Patented Feb. 3, 1948

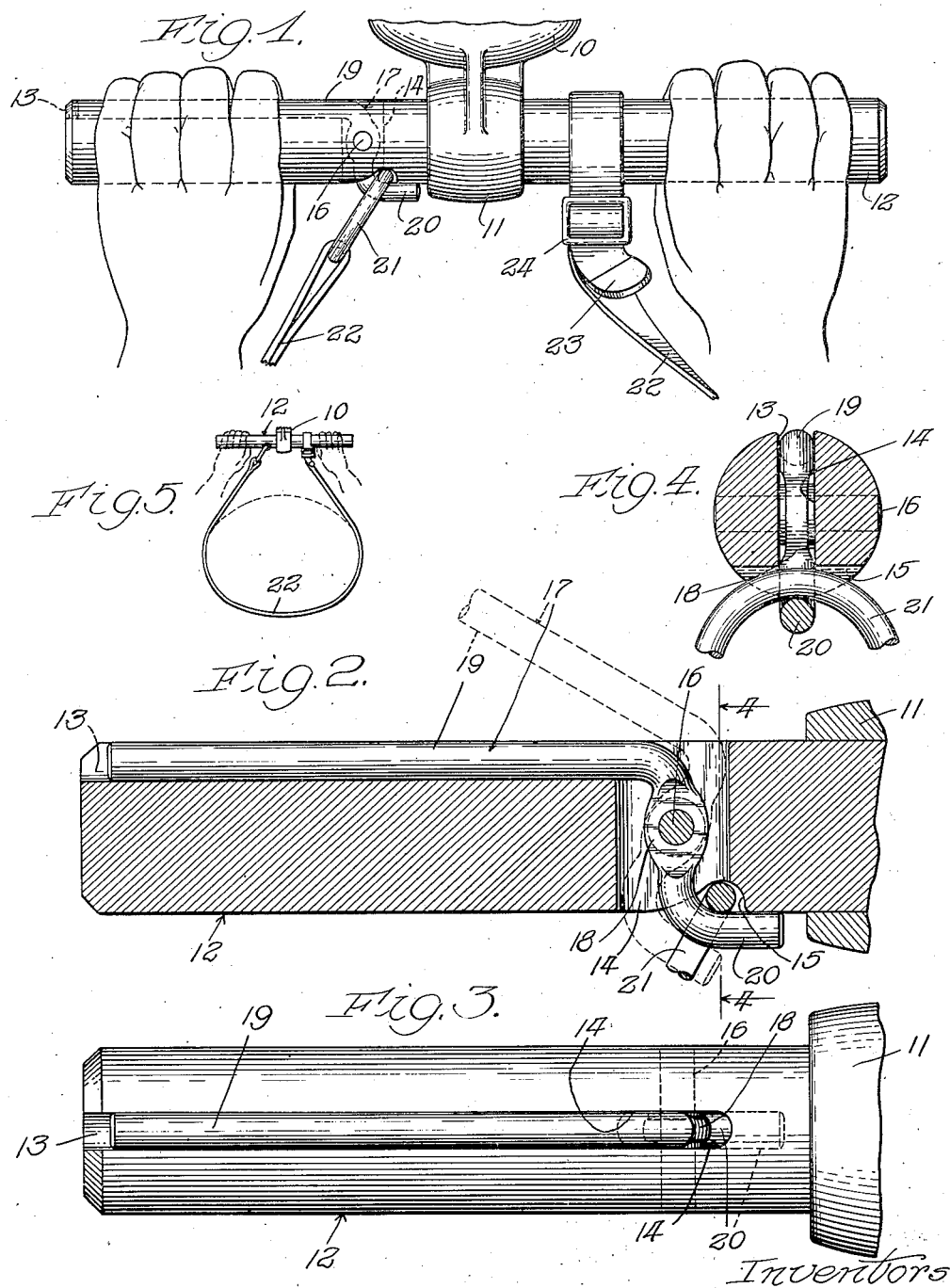

2,435,428

UNITED STATES PATENT OFFICE 2,435,428

SAFETY BELT

Lawrence F. Erbach, Chicago, Ill., and Arnold T. Riedi, Muskegon, Mich., assignors to The Brunswick-Balke-Collender Company, Chicago, Ill., a corporation of Delaware Application July 19, 1946, Serial No. 684,878

7 Claims. (Cl. 51—174)

The present invention relates to a safety belt and more particularly to a belt that is readily attached to and automatically detached from the wearer.

An object of the invention is to provide a safety belt that can be worn by the operator of a machine, such as a floor sander, to assist in the operation of the machine but which, in cases of emergency or when the belt is no longer needed, is instantaneously and automatically released or removed by the operator removing his hand from the machine handle.

In the operation of certain heavy machines, such as floor sanders, which are pushed and pulled by the operator, it is advantageous to strap the machine to the operator by a belt attached to the machine handle and which passes around the operator's waist. The strap permits the operator to pull the machine by the strap and removes part of the strain from the operator's arms. An object of the invention is to provide a readily attachable and detachable device for connecting such a belt to the handle of the machine.

Moreover, such machines when used on floors that contain polish of inflammable material sometimes burst into flames due to the friction of the sanding device on such material or by the inflammable dust collected in the dust compartment of the machine being ignited for any reason. An object of the invention is to provide an attachment for such a belt which may be instantly released as the operator removes his hand from the machine handle. Such a device is desirable at all times because of the time it saves and is of great importance should the machine catch fire, as it permits the operator to release himself from the machine as soon as he notices the fire.

Other objects and advantages will become readily apparent from the following detailed description taken in connection with the accompanying drawings in which:

Fig. 1 is a plan view of a machine handle with the belt attached thereto.

Fig. 2 is a fragmentary sectional view of the handle and belt attachment.

Fig. 3 is a top plan view of the part of the handle shown in Fig. 2.

Fig. 4 is a vertical sectional view taken on the line 4—4 of Fig. 2.

Fig. 5 is a top plan view, partly fragmentary, of the device attached to an operator.

While our invention is susceptible of embodiment in many different forms, we have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In the drawings there is shown a machine, such as a floor sander 10 having a sleeve or collar 11 in which is secured an elongated operating handle 12. A threaded bolt or other means (not shown) is preferably provided to secure the handle in the sleeve and to permit its ready insertion therein or removal therefrom. The handle may be of wood or other suitable material and circular, square or of any other desired cross section.

On the side of the handle remote from the operator there is provided an elongated shallow groove 13 extending from an end of the handle to a point near its center where it communicates with a narrow slot 14 extending through the handle from the side on which the groove is cut to the side opposite thereto and on which side is a cutout portion 15.

Rotatably mounted on a pin or stud 16 extending through the handle and transversely of the slot 14 is a belt latch member 17 having a body portion 18 in which is a central opening to receive the stud 16 and a long arm 19 and a short arm 20 extending at right angles to, but in opposite directions from, each end of the body portion 18. The long arm 19 is adapted to be received snugly in the groove 13 and the short arm 20 is adapted to extend over the cutout portion 15 and terminate just short of the collar 11.

The short arm 20 of the latch member 17 is adapted to receive a ring 21 on one end of a belt 22, the other end of which 23 is looped around the right side (as shown in the drawings) of the handle 12. A fastening device 24 secures the end 23 of the belt 22 to the handle where it remains so long as the belt is in use.

To attach the belt to the machine operator it is only necessary to move the latch member 17 to the position shown in dotted lines in Fig. 2 and slip the ring 21 around the short arm 20 of the latch member. The operator then grasps the long arm 19 and pulls it into the groove 13 which causes the short arm 20 to be brought up tightly against the handle 12 and forces the ring 21 into the cutout portion 15. The top of the handle arm 19 is flush with the adjoining sides of the handle 12 so as not to interfere with operation of the handle and because of the length of the arm 19 as compared to the arm 20, little effort is required to maintain the parts in locked position, as shown in full lines in Figs. 1 and 2. The operator grasps the handle while he is operating the machine but can use his back against the belt when pulling the machine and take substantially all the load from his arms.

To remove the belt it is only necessary for the operator to remove his left hand from the handle and the latch member will swing on its pivot and the ring will immediately slide off the short arm and the belt will be removed from around the operator. Such removal is entirely automatic and substantially instantaneous if any pull is exerted against the belt which is always the case as the weight of the belt and ring are sufficient to rotate the latch member.

We claim:

1. A safety belt attachment for a manually movable machine adapted to be pushed and pulled by the operator and provided with a handle and a belt with one end secured to part of the handle and the other end provided with a loop, means to connect said looped end of the belt to the handle comprising a latch member movably mounted in the handle and having means for ready attachment to, and detachment from, said loop and means adapted to be grasped by the operator for locking said loop by said first mentioned means, said member being automatically unlocked when the operator releases his grip.

2. A safety belt attachment for a manually movable machine adapted to be pushed and pulled by the operator and provided with a handle and a belt with one end secured to part of the handle and the other end provided with a loop, means to connect said looped end of the belt to the handle comprising a latch member swingably mounted on the handle and having a pair of arms adapted to be brought into contact with the handle, one arm being adapted to receive said loop and lock it against the handle, the other arm being adapted to be grasped by the hand of the operator when he grasps the handle whereby both arms are moved into contact with the handle and maintained in such contact until the operator releases the handle.

3. A device as claimed in claim 2 wherein the arm grasped by the operator is substantially longer than the other arm.

4. A device as claimed in claim 2 wherein the handle is provided with a groove to receive the arm grasped by the operator.

5. A device as claimed in claim 2 wherein the latch member comprises a body portion mounted in the handle and the arms extend in opposite directions from the ends of the body portion.

6. A device as claimed in claim 2 wherein the latch member extends through the handle and is mounted on a pin therein.

7. A safety belt attachment for a manually movable machine adapted to be pushed and pulled by the operator and provided with a handle and a belt with one end secured to part of the machine and the other end provided with a catch member, means to connect said catch member to the handle comprising a latch member movable mounted in the handle and having means for ready attachment to, and detachment from, said catch member and means adapted to be grasped by the operator for locking said catch member by said first mentioned means, said member being automatically unlocked when the operator releases his grip.

LAWRENCE F. ERBACH.
ARNOLD T. RIEDI.

REFERENCES CITED

The following references are of record in the file of this patent:

UNITED STATES PATENTS

| Number | Name | Date |
| --- | --- | --- |
| 1,266,964 | Lopour | May 21, 1918 |
| 1,589,196 | McCarty | June 15, 1926 |